(12) United States Patent
Hall

(10) Patent No.: US 8,162,355 B2
(45) Date of Patent: Apr. 24, 2012

(54) AIRBAG INFLATOR CONNECTOR

(75) Inventor: Christopher Donald Hall, Algonac, MI (US)

(73) Assignee: TK Holdings Inc., Auburn Hills, MI (US)

( * ) Notice: Subject to any disclaimer, the term of this patent is extended or adjusted under 35 U.S.C. 154(b) by 554 days.

(21) Appl. No.: 12/073,419

(22) Filed: Mar. 5, 2008

(65) Prior Publication Data

US 2009/0224516 A1 Sep. 10, 2009

(51) Int. Cl.
*F16L 39/00* (2006.01)

(52) U.S. Cl. ......... 285/319; 285/322; 285/331; 285/921

(58) Field of Classification Search ............. 285/223, 285/307, 319, 244, 242, 921, 322, 323, 331; 403/329, 397
See application file for complete search history.

(56) References Cited

U.S. PATENT DOCUMENTS

| | | | | |
|---|---|---|---|---|
| 4,332,402 A | * | 6/1982 | Shellhause | |
| 4,486,034 A | * | 12/1984 | Sauer | 285/242 |
| 4,756,558 A | * | 7/1988 | Beamer | 285/319 |
| 4,890,456 A | * | 1/1990 | Jordan | 285/319 |
| 5,172,940 A | * | 12/1992 | Usui et al. | 285/319 |
| 6,655,491 B1 | * | 12/2003 | Stoll et al. | 285/319 |
| 2005/0184518 A1 | * | 8/2005 | Muhammad et al. | 285/319 |
| 2008/0284163 A1 | * | 11/2008 | Proulx et al. | 285/242 |

* cited by examiner

*Primary Examiner* — James Hewitt
*Assistant Examiner* — Jay R Ripley
(74) *Attorney, Agent, or Firm* — Foley & Lardner LLP

(57) ABSTRACT

An inflatable safety system for a vehicle, the safety system including an inflator assembly and an airbag assembly. The safety system further includes an airbag inflator connector securely connecting the inflator assembly to the airbag assembly. The inflator assembly and the airbag assembly may be connected to one another at a connection in which a male portion that includes a first exterior projection extends into a tube having a second exterior projection. The airbag inflator connector has, among other elements, a first and second reaction surface, such that the first reaction surface is positioned adjacent a surface of the first projection, and the second reaction surface is positioned adjacent a surface of the second projection.

9 Claims, 9 Drawing Sheets

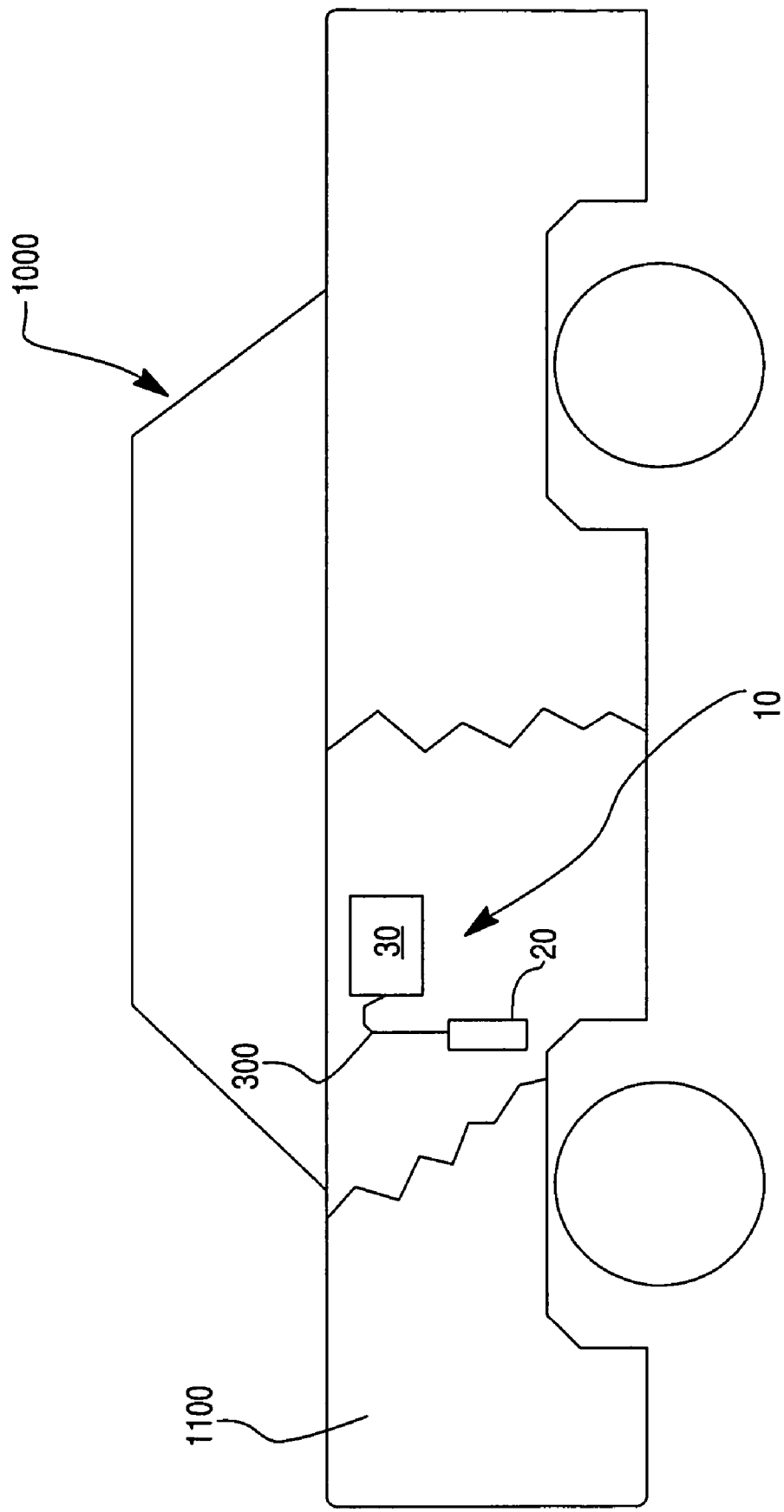

AIRBAG INFLATOR CONNECTOR

BACKGROUND

Collision deployed inflatable safety systems improve the safety features of vehicles with regard to survivability of drivers and passengers during collisions. Upon a collision resulting in a depletion of sufficient kinetic energy of a vehicle, airbags are deployed, providing vehicle occupants with protection.

Airbags are typically inflated by gas generated by an inflator. Typically, the gas travels from the inflator, through a conduit (a tube or the like), and into the airbag, inflating the airbag (and thus deploying the airbag). The forces resulting during inflation of the airbag are extreme and develop suddenly. In some conventional safety systems the airbag is attached to the inflator using crimping or threaded fasteners. These arrangement are difficult to assemble and disassemble.

SUMMARY

The disclosed embodiments relates to a system, method and device for coupling an airbag inflator assembly to an airbag assembly, such that the coupling will be robust while at the same time economical and permit disassembly of the airbag inflator assembly from the airbag assembly without damaging some or all of the sub-components of the safety system (e.g., eliminating the need to cut away the airbag assembly from the inflator assembly in the case of the crimped connection, etc.)

Accordingly, in an exemplary embodiment, there is an inflatable safety system for a vehicle, comprising an inflator assembly, an airbag assembly, and an airbag inflator connector securely connecting the inflator assembly to the airbag assembly, wherein the airbag inflator connector has a first and second reaction surface. In this embodiment, the inflator assembly and the airbag assembly are connected to one another at a connection in which a male portion that includes a first exterior projection extends into a tube having a second exterior projection. Further, in this embodiment, the first reaction surface is positioned adjacent to a surface of the first projection, and the second reaction surface is positioned adjacent a surface of the second projection.

In an other embodiment, an airbag inflator connector is provided. The connector includes an inner collar formed from a plurality of first teeth and an outer collar formed from a plurality of second teeth. The collar is configured so that an inner diameter as measured at the crown of the second teeth of the outer collar is greater than an outer diameter as measured at the crown of the first teeth of the inner collar, the inner collar and the outer collar being connected to one another. The outer collar is coaxially positioned with respect to the inner collar so as to have a coaxial axis. The airbag inflator connector is adapted so that the plurality of first teeth of the inner collar are elastically deformable at the same time away from the coaxial axis in order to increase a value of the outer diameter by at least twice a minimum wall thickness of the inner collar as measured proximate to the outer diameter. The airbag inflator connector is adapted so that the plurality of second teeth of the outer collar are elastically deformable at the same time away from the coaxial axis in order to increase a value of the inner diameter by at least twice a minimum wall thickness of the outer collar as measured proximate to the inner diameter.

In another embodiment, an inflatable safety system for a vehicle is provided. The system includes an inflator assembly and an airbag assembly including a tube adapted to direct inflator gas into an airbag. The system also includes an airbag inflator connector securely connecting the inflator assembly to the tube of the airbag assembly. The airbag inflator connector is adapted to have a dual-clip action that clips the airbag inflator connector to the inflator assembly and clips the tube to the airbag inflator connector to securely connect the inflator assembly to the airbag assembly.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 6 presents a schematic view of a vehicle utilizing an inflatable safety system.

DETAILED DESCRIPTION

Figure 1:
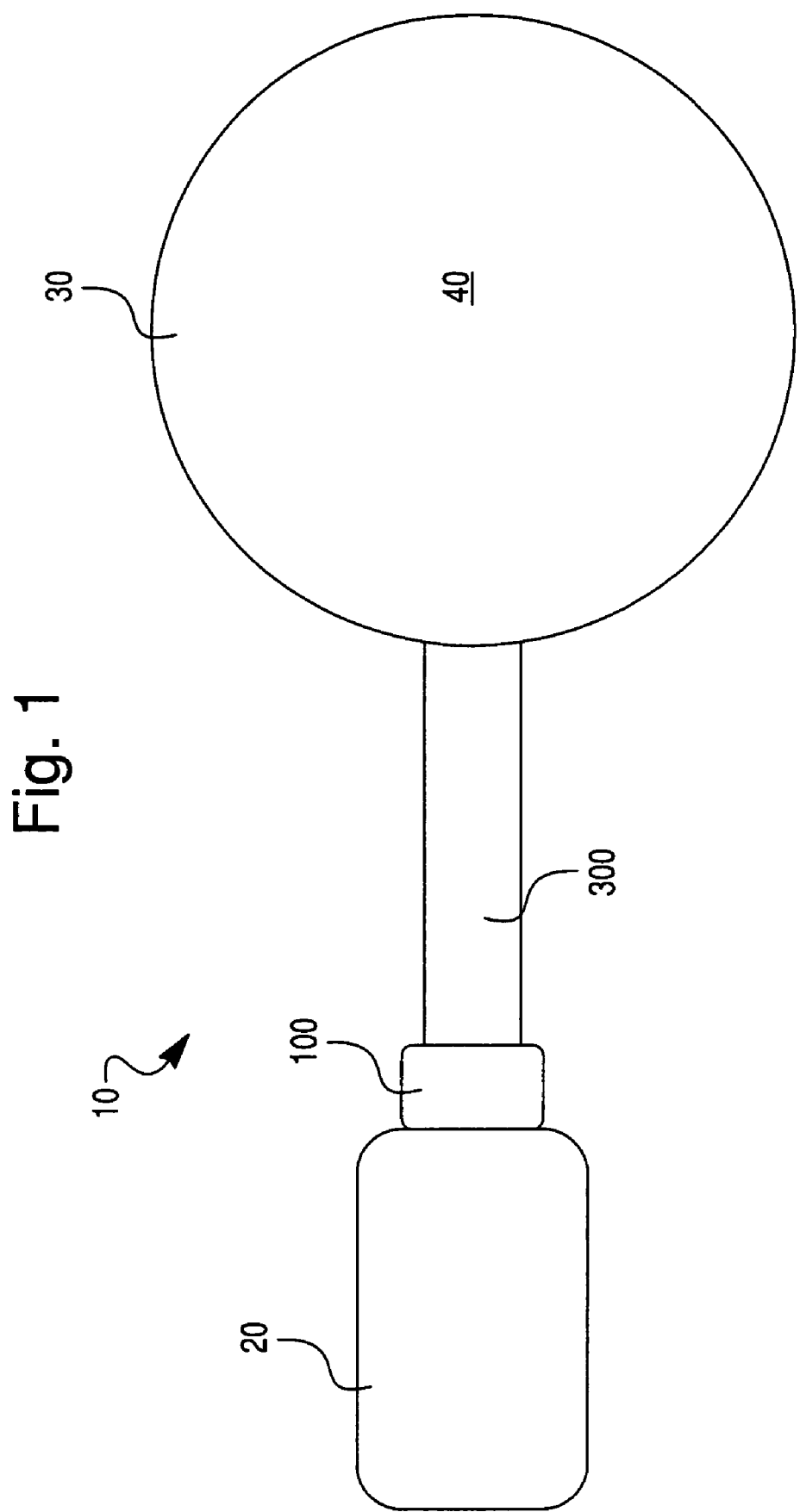
FIG. 1 presents a schematic view of an inflatable safety system for a vehicle.

In an exemplary embodiment, there is an inflatable safety system 10 as shown in FIG. 1, including an inflator assembly 20, an airbag assembly 30 with a tube 300 permitting the inflator assembly 20 to be in fluid communication with an airbag 40, and an airbag inflator connector 100 that securely connects the inflator assembly 20 to the airbag assembly 30. The inflatable safety system 10 utilizes a unique configuration to securely connect the inflator assembly 20 and the airbag assembly 30 together utilizing airbag inflator connector 100, as will now be described.

Figure 2:
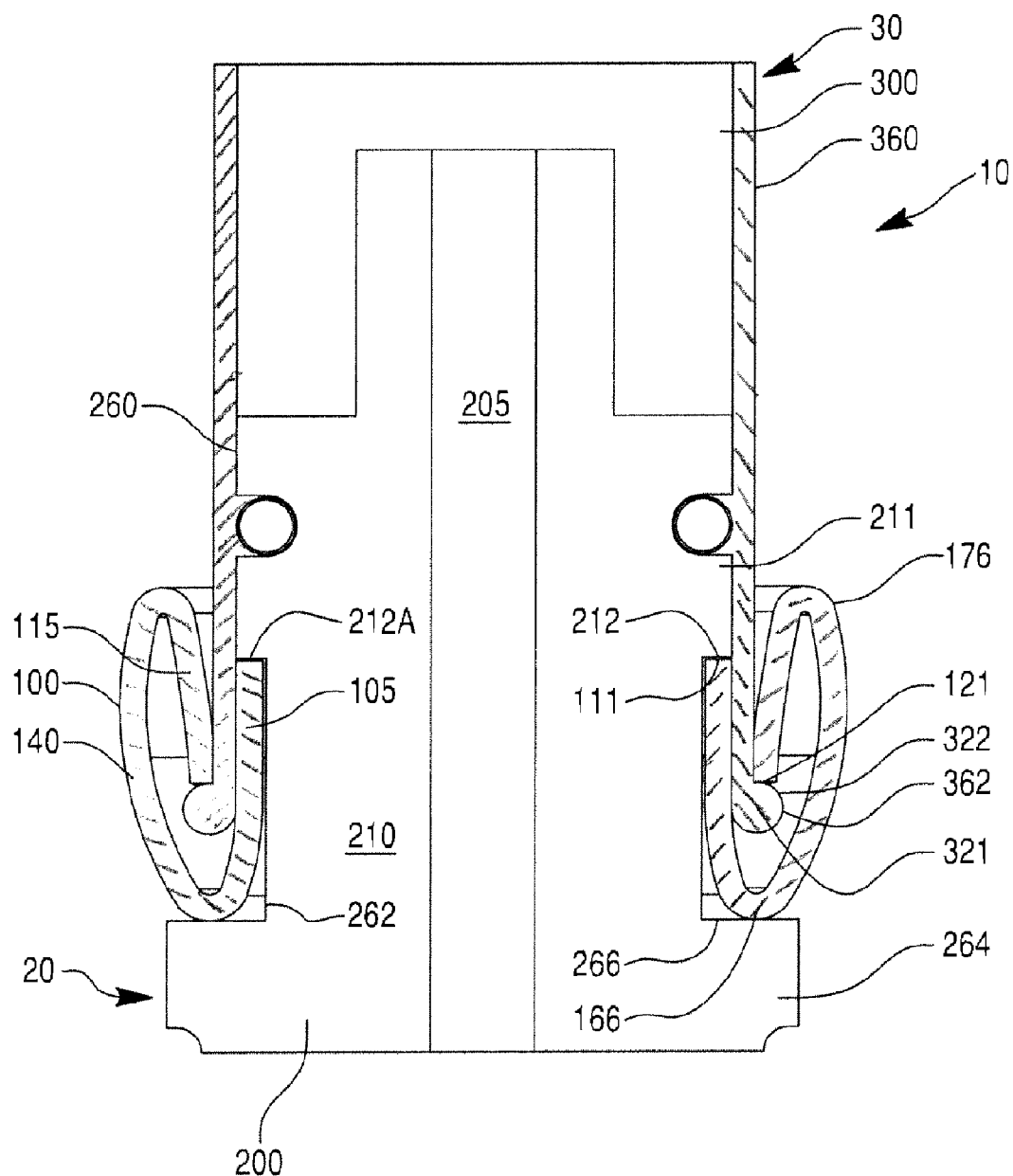
FIG. 2 presents a sectional view of an airbag tube and an inflator, which are used in the safety system depicted in FIG. 1, securely connected to one another by a connector ring.
Figure 3:
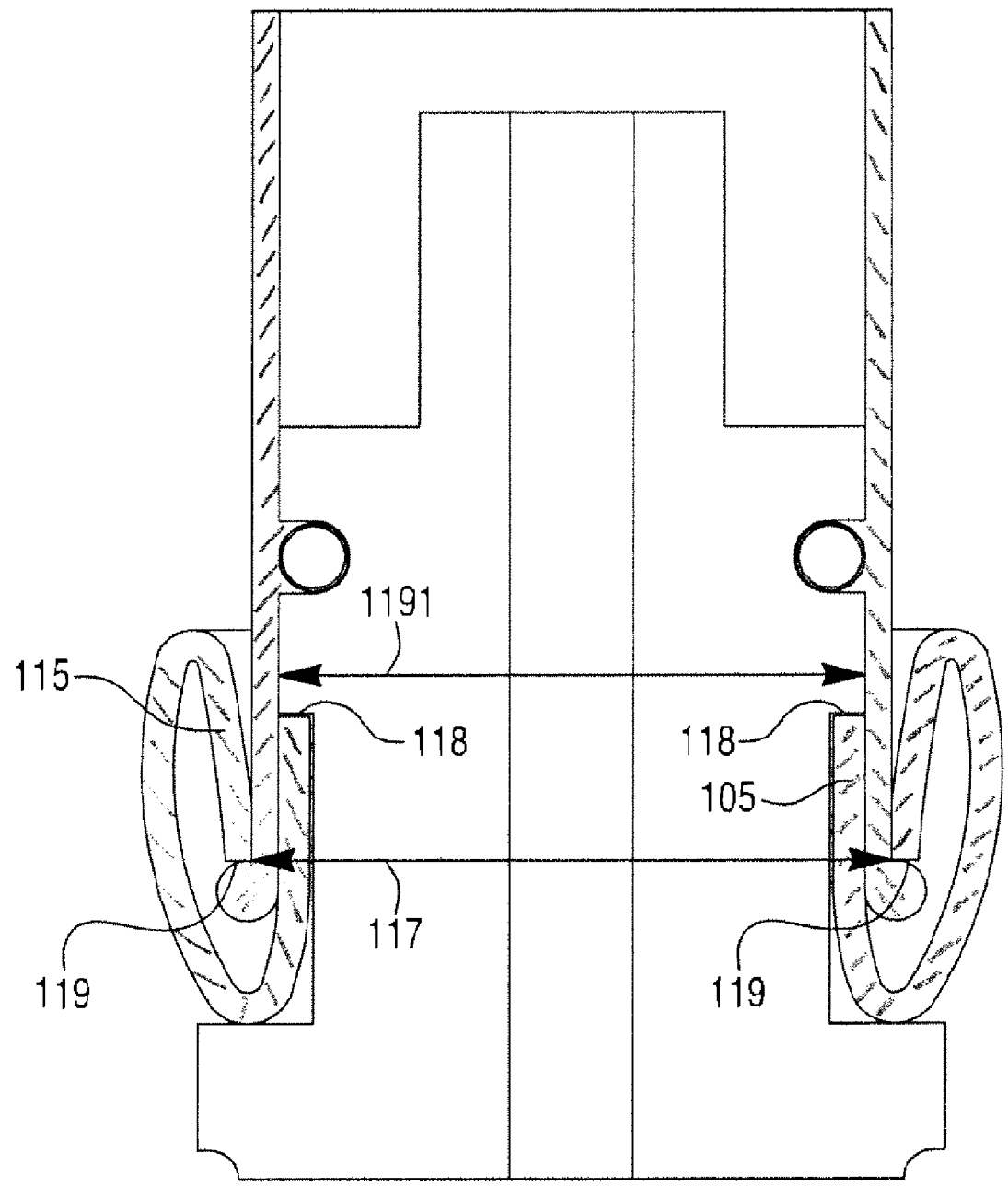
FIG. 3 reproduces the sectional view of the airbag tube and the inflator presented in FIG. 2.

In the exemplary embodiment depicted in FIGS. 2 and 3, representing a cross-sectional view of the area at the connection point of the inflator assembly 20 to the airbag assembly 30, the inflator assembly 20 and the airbag assembly 30 are connected to one another at a connection in which a male portion 210 of an inflator 200 of the inflator assembly 20 extends into a tube 300 of the airbag assembly 30, the tube 300 being in fluid communication with airbag 40 (see FIG. 1). Accordingly, when the inflator assembly 20 is activated, inflator gas is discharged through the hollow portion 205 of the male portion 210 and into the tube 300, where the gas then flows to the airbag 40 to inflate the airbag 40. The airbag and tube may be integrally connected. No discreet separate tube section may be provided.

During the airbag inflation process, forces are generated which tend to result in at least one of the male portion 210 of the inflator 200 pushing away from the tube 300, and the tube 300 pushing away from the male portion 210, such that if the tube 300 is not securely connected to the inflator 200, the male portion 210 will no longer be inserted in the tube 300/the tube 300 might expand or otherwise be deformed in a manner such that a significant amount of gas leakage may occur out the open end of the tube 300.

To ensure that the inflator 200 is securely connected to the tube 300, connector 100 is utilized in the safety system 10. An exemplary embodiment of the connector 100 is presented in the figures. The connector 100 is adapted to have a dual-clip action that clips the airbag inflator connector 100 to the inflator assembly 20 and clips the airbag inflator connector 100 to the tube 300 to securely connect the inflator assembly 20 to the airbag assembly 30. In this exemplary embodiment, the connector 100 may be designed such that it is relatively easily "unclipped" or otherwise detached from the inflator assembly 20 and/or the airbag assembly 30. As may be seen from the figures and as described herein, the connector 100 in this embodiment is a unitary resilient structure that secures the inflator assembly 20 to the airbag assembly 30 without a threaded interface and without a crimped interface which provides a robust connection.

The connector 100 is configured to react against an exterior projection 211 on the inflator 200 (more particularly, against a surface 212 of the exterior projection 211) and an exterior projection 321 on the tube 300 (more particularly, against a surface 322 of the exterior projection 321), which, in the embodiment depicted in the figures, the exterior projection 321 is a rounded lip round around the outer diameter of tube 300 at the opening of the tube 300, so as to resist against the reaction forces generated during inflation of the airbag. In this regard, the connector 100 includes reaction surfaces 111 and 121, which respectively react against exterior projections 211 and 321 (more particularly, surfaces 212 and 322 of the respective exterior projections, as detailed just above) so as to keep the inflator 200/tube 300 from deleteriously moving with respect to each other. In the embodiment of the connector 100, depicted isometrically in FIG. 4 (a cross-section of which is depicted in FIGS. 2 and 3), the reaction forces applied against the projections 211 and 321 are applied in a direction substantially opposite to one another. That is, during inflation, the inflator 200 experiences a force in a first direction and the tube 300 experiences a force in a second direction opposite the first direction causing the two components to be urged apart from one another, and thus the connector 100, which counteracts these forces by, in some embodiments, abutting the respective projections, likewise imparts reaction forces in opposite directions. During inflation, when the connector 100 is reacting against the generated forces, a force profile in the connector 100 may resemble/may be analogous to a force profile in a C-clamp exerting clamping pressure on a clamped object.

An exemplary geometry of the connector 100 will now be particularly described, followed by an exemplary scenario of use of the connector 100, followed then by non-exhaustive descriptions of features of this and various other embodiments.

Figure 4:
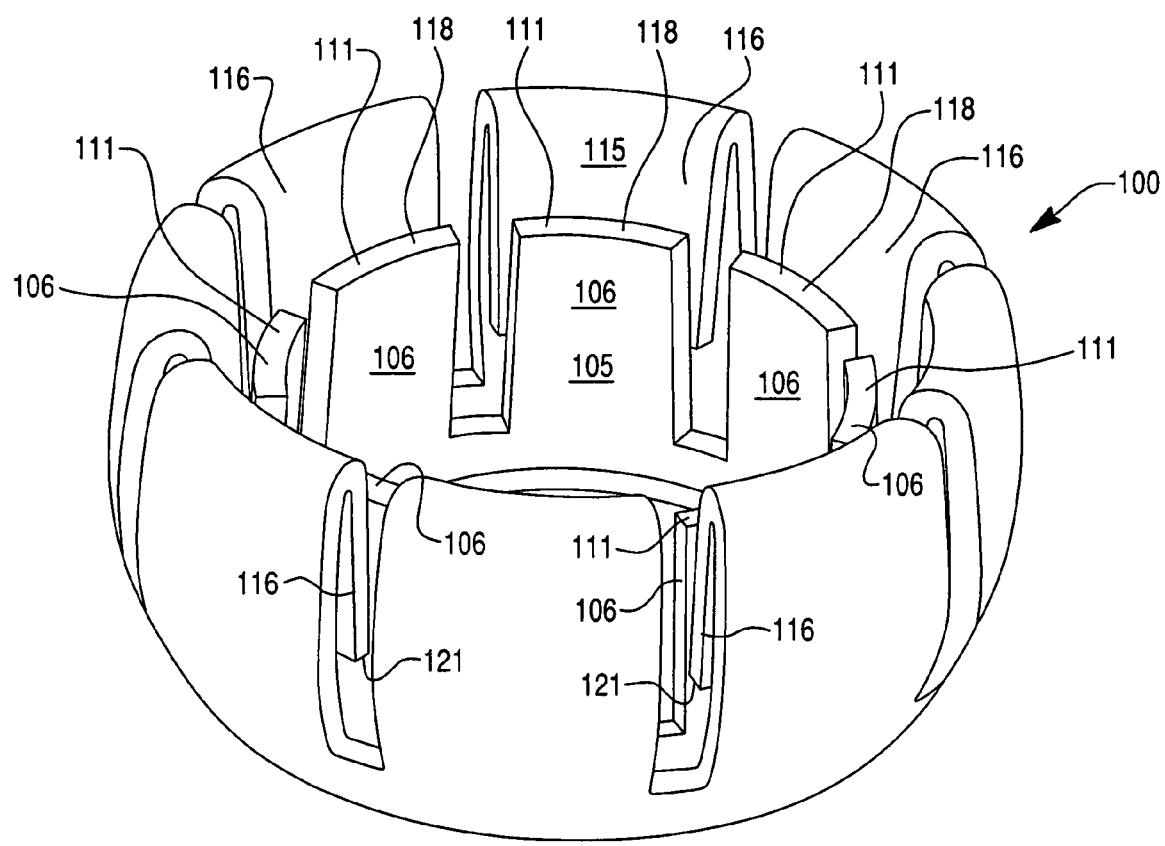
FIG. 4 presents an isometric view of an airbag connector.

Referring to FIG. 4, which depicts an isometric view of an embodiment of the airbag connector 100 shown in cross-sectional view in FIGS. 2 and 3, and also referring to FIGS. 2 and 3, the airbag inflator connector 100 includes an inner collar 105 formed from a plurality of teeth 106 and an outer (relative to the inner collar 105) collar 115 formed from a plurality of teeth 116. The outer collar 115 has an inner diameter 117 that, when measured at the crown 119 of the teeth 116 of the outer collar 115, is greater than an outer diameter 1191 of the inner collar 105 as measured at the crown 118 of the teeth 106 of the inner collar 105. In the embodiment depicted in the Figures, the inner collar 105 and the outer collar 115 are connected to one another, the outer collar 115 being coaxially positioned with respect to the inner collar 105.

To describe the specific geometry of the embodiment depicted in FIGS. 2-4, a cross-section of the connector 100 includes a solid sectional element that, with respect to the direction of the longitudinal axis/coaxial axis of the outer and inner collars, extends away from surface 212 on the exterior projection 211 on the inflator 200, then reverses direction to extend past the surface 212 on the exterior projection 211, and then reverses direction again and extends towards the surface 212 of the exterior projection 211. In the embodiment depicted in the figures, the element extends past surface 212, although in other embodiments, the element may not extend past surface 212. Further, as may be seen in FIGS. 2-3, in some embodiments, the solid sectional element of the cross-section effectively wraps around the exterior projection 321, shown in the figures as a lip around the outer diameter of tube 300.

Connector 100 may be configured such that the outer ring 115 and the inner ring 105 forms a channel between which a wall of the tube passes, a distance between two closest points on either side of the channel being smaller, and the channel being more narrow, than the applicable measurements of the lip 321 of the tube, the distance and the diameter being measured on a plane passing through the longitudinal axis/coaxial axis of the connector 100. In this regard, the narrowness of the channel "traps" the lip inside the connector, and thus trapping the end of the tube 300 in the connector 100. In the case of a connector 100 firmly attached to an inflator 200, the tube is thus trapped in fluid communication with the end of the inflator 200. In some embodiments, the inner ring 105 and the outer ring 115 pinch the wall of the tube in the channel.

Figure 5A:
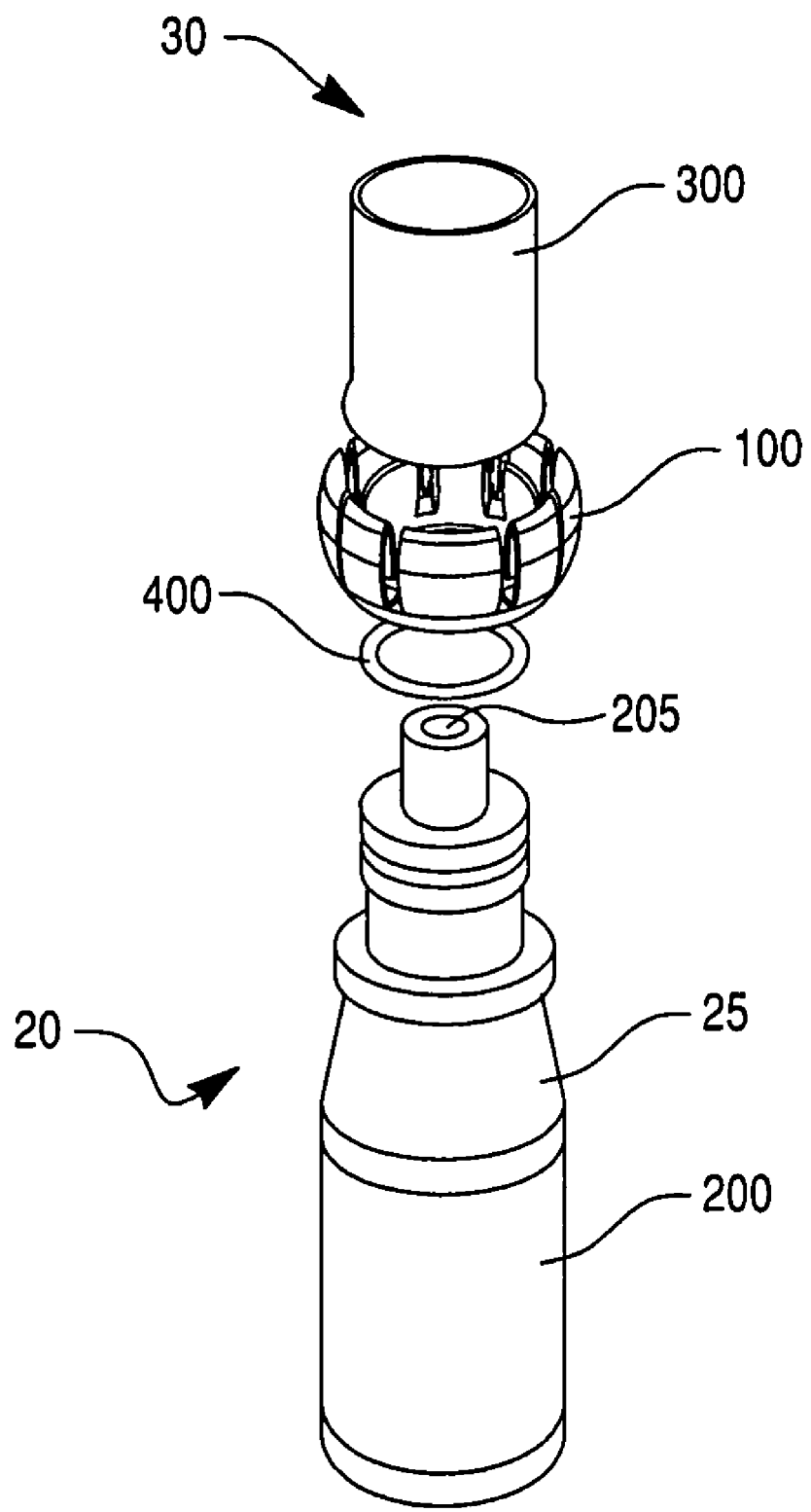
FIGS. 5a, 5b, and 5c schematically depict connection of the inflator to the airbag tube.
Figure 5B:
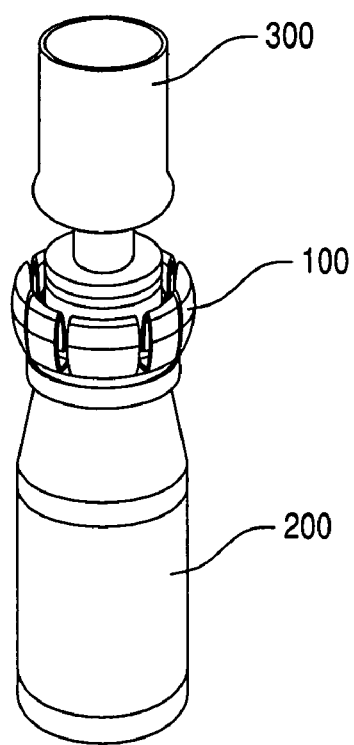
Figure 5C:
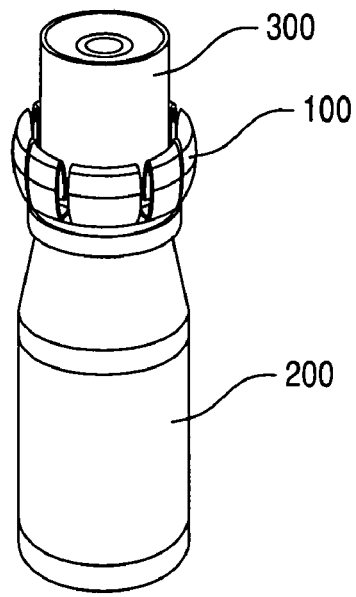

Before describing some of the more particular features, an exemplary process for attaching the connector 100 to the inflator 200/tube 300 to secure the two components together will now be described with reference to FIGS. 5a-c, in particular, and other figures, in general. FIGS. 5a, 5b and 5c illustrate how connector 100 may be used during connection of inflator 200 to tube 300. Specifically, these figures successively depict steps in the process of using connector 100 to connect the inflator 200 to tube 300. First, as shown in FIG. 5a, inflator 200, connector 100, and tube 300 are separate from each other. Next, as shown in FIG. 5b, connector 100 is slid onto the inflator 200. As shown in FIGS. 2-3, when the connector 100 is slid onto inflator 200, the teeth 106/inner collar 105, are/is pushed back by the forward shoulder of the exterior projection 211 to give clearance to the connector 100. Once the connector is sufficiently pushed down onto the inflator 200 the teeth 106/inner collar 105 will spring back towards the inflator 200 so that surface 111 may abut surface 212, as shown in FIGS. 2-3, and thus connector reaction surface 111 will be securely locked against projection 211 of the inflator 200. In the embodiments depicted in the figures, the connector 100 is pushed downward until bend 166 contacts exterior projection 264 (or, more particularly, surface 266 of projection 264) of the inflator 200, although in other embodiments, such as where exterior projection 264 is further from exterior projection 211, the connector 100 may not be pushed so far. In some embodiments, the inflator 200 and the connector 100 are so dimensioned and toleranced that the connector 100 is effectively held stationary to the inflator 200 with respect to the longitudinal axis of the connector 100. In some embodiments, grooves or prongs or the like are provided on the connector and/or on the inflator 200 so as to prevent/limit rotation of the connector 100 about the longitudinal axis of the connector 100 with respect to the inflator 200.

At this point, connector ring 100 is now securely connected to inflator 200. Next, tube 300 is slid around the projection 211 and the end of tube 300 (more particularly, tube lip 321) is slid into the connector 100, as shown in FIG. 5c. As tube 300 is moved into the connector 100, tube lip 321 pushes the teeth 116/the outer collar 115 outward so that there is sufficient clearance between the inner collar 105 and the outer collar 115 for the lip 321 to pass between these two components of connector 100 (i.e., through the channel formed by the outer and inner rings). Once the tube 300 is moved a sufficient distance into the connector 100, as shown in FIG. 3, the outer collar 115 will spring back towards the center of the connector 100. That is, once the tube 300 (lip 321) is slid into the connector 100 a sufficient distance, the lip 321 becomes trapped between the inner collar 105 and the outer collar 115 (see FIGS. 2 and 3). At this point, in the embodiment depicted in the Figs., reaction surface 121 of connector 100 abuts against surface 322 on lip 321, essentially locking the tube 300 to the inflator 200. Accordingly, once the reaction surfaces 111 of the teeth 106/inner collar 105 expand(s) towards the center of the connector 100, when clear of exterior projection 211, and once reaction surfaces 121 of teeth 116/outer collar 115 also expand(s) towards the center of the connector 100 when clear of lip 321, the teeth 106 can react against the surface 212 of the inflator 200 and the teeth 116 can react against the surface 322 of the tube 300 so as to "lock" the tube 300 to the inflator 200, as is depicted in FIGS. 2-3 and 5c.

As will be understood by the details presented in the above scenario, in some embodiments, the airbag inflator connector 100 is designed so that the plurality of teeth 106 of the inner collar 105 are elastically deformable. In the scenario above, the teeth 105 deform a sufficient amount to "clear" the projection 211 so that the connector 100 may be slid onto the male portion 210 of the inflator 200. Accordingly, in some embodiments, the teeth 106 of the inner collar 105 are adapted to expand, at the same time, away from the coaxial axis of the connector 100 so as to increase a value of the outer diameter 1191 of the inner collar 105 by at least twice a minimum wall thickness of the inner collar as measured proximate to the outer diameter 1191. The outer collar 115 may be elastically deformable so that the teeth 116 of the outer collar 115 expand, at the same time, away from the coaxial axis of the connector 100 so as to increase a value of the inner diameter 117 of the outer collar 115 by an amount equal to at least twice a minimum wall thickness of the outer collar 115 as measured proximate to the inner diameter 117. In some embodiments, diameters will expand even more—at least three, four, five, six, and/or more times the respective minimum wall thickness. Indeed, the outer collar 115 may expand more than twice the respective wall thickness to accommodate a removal tool. Accordingly, in some embodiments, the teeth 116 of the collar 115 and the teeth 106 of the collar 105 are, respectively, elastically deformable at the same time away from the coaxial axis so as to increase a value of the inner and outer diameters, respectively.

While the scenario described above details first installing the connector 100 onto the inflator 200, some scenarios may include first installing the connector 100 onto the tube 300, followed by installation of the connector 100 onto the inflator 200. In this regard, it is noted that both the order of component attachment and the movement of components may be varied depending on which embodiment is being utilized. The male-female relationship of the inflator and tube may be reversed from that depicted in the drawings. By way of example only and not by way of limitation, some embodiments are such that the inflator assembly has a configuration such that the interface of the inflator is female with respect to the tube of the airbag assembly. That is, the tube may be configured with a connector of an analogous configuration to element 210 of the inflator 200 depicted in the drawings, and the inflator may be configured with a connector of an analogous configuration to element 300 with element 321. A connector may also be utilized in such a configuration.

Another possible embodiment includes a design where the connector is part of the inflator or the tube. For example, the connector ring might be a part of (an integral part of, in some instances) the inflator assembly or the airbag assembly tube. Still further by example, the outer collar might be a part of the inflator, or the inner collar might be a part of the tube. In an exemplary embodiment, outer structure 140 of the connector 100 might protrude from the side of the male portion 210. In such an embodiment, the outer ring 115 may still function in the same manner to retain the female tube 300 component. Such a two-piece embodiment may still retain the connection and be consistent with the teachings contained herein.

It will be noted here that the embodiments depicted in the figures are only exemplary. Other embodiments may not utilize, for example, a round connector, but instead utilize a connector of a different shape. Another possible embodiment involves reaction surfaces that are not flat (see surfaces 111 and 121). Instead, the reaction surfaces may be a variety of different shapes (e.g., a concave or convex surface may be used, a grooved or teethed surface may be used to increase friction forces, etc. Any sufficiently viable configuration may be used so long as the reaction surfaces tolerate sufficient reaction forces that adequately prevents the airbag assembly 30 from moving away from the inflator assembly 20. Similarly, the material used to create the connector 100 may vary, as long as the basic functional aspects of the inflator may be achieved. In some embodiments, the material may be metal, while in others, be high strength composite materials (Gr-Ep), and/or plastics, etc. Aluminum alloys and steel alloys may be used.

Having described a generalized exemplary embodiment of the connector 100 and an exemplary scenario of the connection process, some more specific details of will now be described.

In an exemplary embodiment, the interface between the inflator assembly 20 and the airbag assembly 30, proximate to the connector 100, has a specific configuration that is compatible with use of the connector 100. Specifically, inflatable safety system 10 has a configuration where the male portion 210 extends from a body 25 of the inflator assembly 20 that contains a propellant for generating inflation gas and includes at least two cylindrical surfaces 260, 262 that are substantially coaxial with one another. The exterior projection 211 includes one of the two cylindrical surfaces, surface 260, and extends above the other cylindrical surface, surface 262. The male portion 210 further includes another exterior projection (element 264), that has a surface 266 that faces the first exterior projection 211 and also extends above cylindrical surface 262. The connector 100 may interface with these components as depicted in the figures and/or described above.

In the configuration just described, in some embodiments, the surface 212 of the first projection 211 is formed between the respective surfaces 260 and 262, thus giving the connector surface 111 a surface against which it may react. In the embodiment depicted in the figures, projection 211 includes a substantially flat wall 212a that lies on a plane that is substantially orthogonal to surface 262, the flat wall 212a facing the first reaction surface 111 of the airbag inflator connector 100.

The tube 300 likewise may include one or more surfaces 360 and one or more surfaces 362. The projection 321 (lip 321) may be formed between surface 360 and surface 362 and/or may include one or both of those surfaces. This projection 321 may include an arcuate surface as depicted in the figures and/or a flat surface or other type of surface. The surface may include a face that faces away from the reaction surface 121 of the airbag inflator connector 100.

As may be seen in the figures., the connector 100 has certain geometries that are conducive with interfacing with the tube 300 and the inflator 200. Various geometries may be utilized, providing that the connector 100 sufficiently interfaces with the requisite components as desired (e.g., including disassembly desires) and sufficiently tolerates the expected reaction forces experienced with the inflatable safety system. Accordingly, in some embodiments of the connector 100, referring to FIGS. 2-3, a cross-section of the connector 100 taken in a plane lying on the coaxial axis of the connector 100 and/or an axis formed by the coaxial placement of the male portion 210 inside the tube 300, etc., includes a contiguous portion formed by the outer ring 115 and the inner ring 105 that is of a flattened spiral configuration. In this regard, connector 100 includes a sectional element that, with respect to the direction of the axis, extends away from surface 111 a first distance, and then reverses direction (at 166) to extend a distance such that it passes surface 111, then reverses direction again (at 176) to extend another distance, at least a part of that distance extending back towards the surface 111.

In some embodiments, a portion of the cross-section of the connector 100 lying in the plane discussed above has an approximate form of a flattened capital letter G of Arial font with a truncated top end, as is seen in FIGS. 2 and 3. It will be noted, however, that in other embodiments, the portion of the cross-section may be in the form of a flattened "C" shape (e.g., in embodiments when the projection 211 is located outside the tube 300, etc.) with both ends truncated. The portion of the cross-section may take other forms, as long as the form permits installation and securement of the inflator assembly 20 and airbag assembly 30 as detailed herein.

Regardless of the exact configuration, the connector 100 may be described as having an inner structure (inner ring 105) and an outer structure (element 140, which includes outer ring 115, which is substantially coaxial with the inner ring 105), wherein the inner structure is a resilient structure that encircles the male portion 210 of the inflator 200 and the outer structure encircles the tube 300. The inner structure is adapted to be elastically expanded to have an inner diameter that fits over projection 211 and then, once removed from interfacing with projection 211, substantially immediately elastically contracts so that the value of the inner diameter of the inner structure is lower than a diameter of the projection 211. Further, the outer structure (element 140) is adapted to be elastically expanded to have an inner diameter that fits over surface 362 on lip 321 and then, once removed from interfacing with surface 362, substantially immediately elastically contracts so that the value of the inner diameter of the inner structure is lower than a diameter of the surface 362.

The connector 100 is adapted to resist movement of at least one of a component of the airbag assembly 30 and a component of the inflator assembly 20 away from one another by applying a reaction force against projection 211 of the inflator 200 and applying a reaction force against projection 321 of the tube 300. In some embodiments, this reaction force is applied against projection 211 in a direction substantially opposite to the direction of application of the reaction force applied against projection 321. By analogy, as noted above, in some embodiments, when the connector 100 resists movement as detailed herein, a force profile in the connector 100 resembles a force profile in C-clamp exerting clamping pressure on a clamped object. The collar 115 of the connector 100 may be configured to resist a compressive load applied substantially uniformly to the crown of the teeth 116 of the outer collar in a direction parallel to the coaxial axis when the inner collar 105 is braced substantially uniformly at the crown of the teeth 106 of the inner collar against movement in the direction of the load. In this regard, various embodiments may be evaluated to determine maximum compressive load tolerance by placing the connector 100 around a steel cylinder that corresponds to the male portion 210 of the inflator 200 so as to provide support for the inner ring against inward collapse of the inner ring in a manner concomitant with the support that would be provided to the inner ring by the inflator 200 during gas generation.

As shown in FIGS. 5a-5c, an O-ring 400 may be placed onto inflator 200 prior to installation of connector 100 onto the O-ring. The connector 100 may be relatively easily removed from the safety system 10. Further, in some embodiments, the safety system 10 is of such a configuration (more particularly, the connector 100 and the respective interfacing components) that removal of the connector 100 from the safety system 10 may be accomplished without damaging the airbag assembly 30 in general and the tube 300 in particular and/or the inflator assembly 20 in general and the inflator 200 in particular. Moreover, the configuration of the connector 100 is such that it may be removed from one or both components without damaging the connector. Indeed, in some embodiments the connector 100 may be reused to connect a new inflator and/or a new tube together. Also, alternative embodiments include a connector 100 that may be removed from the inflator 200 and/or the tube 300 without rotating the connector with respect to those components and/or rotating the connector 100 only slightly (e.g., 10, 20, 30 or about 40 degrees or so) with respect to those components.

An embodiment includes a vehicle 1000 that has a body 1100, in which an inflatable safety system 10 according to the various embodiments detailed herein is installed.

Figure 7:
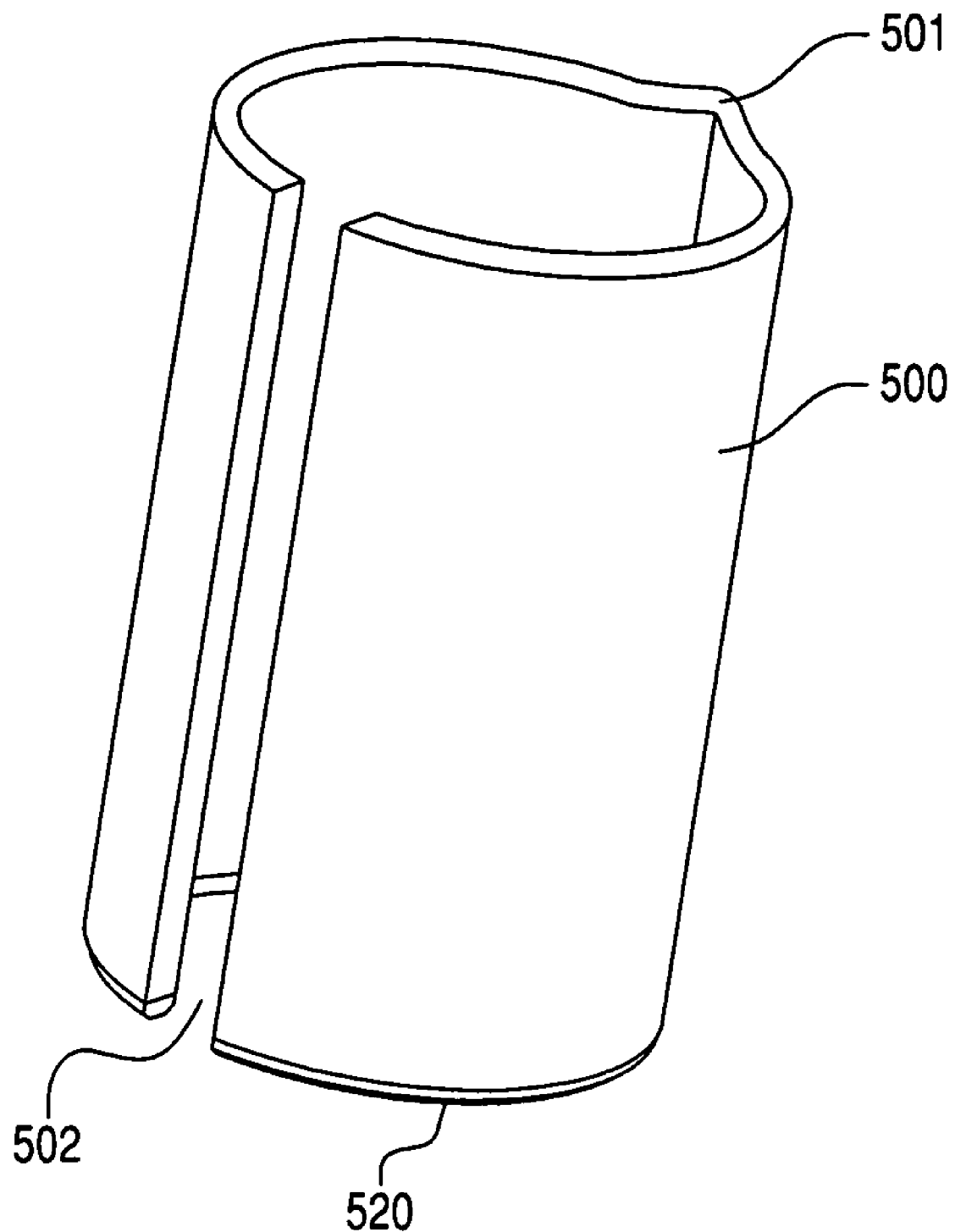
FIG. 7 presents an isometric view of the airbag connector disassembly tool.
Figure 8:
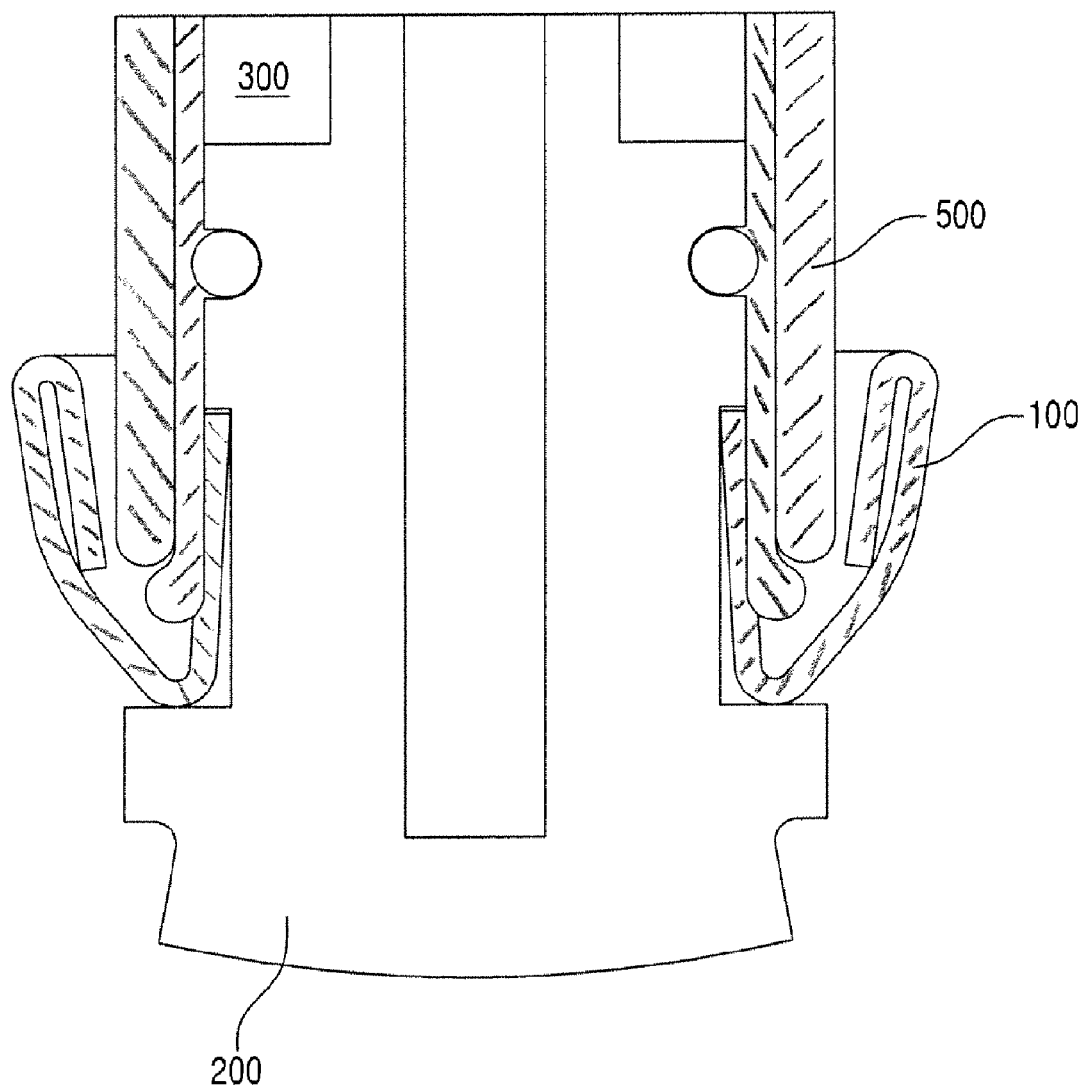
FIG. 8 presents a sectional view of the disassembly tool being used to detach the airbag tube and the inflator.

FIG. 7 depicts an isometric view of a possible embodiment of a disassembly tool 500 that may be used to release the secure connection created by the connector 100, while decreasing the likelihood of imparting damage to the airbag assembly 30 and/or the inflator assembly 20 during connection release. As may be seen, disassembly tool 500 is cylindrical and has a hinge 501 and a slot 502. The tool 500 is of a configuration such that the tool 500 may be inserted between the outer ring 115 and the inner ring 105 of the connector 100 to release connector 100 from tube 300 (hinge 501 permits the tool to be wrapped around tube 300). Particularly, as seen in FIG. 8 (depicting the section of the safety system 10 depicted in FIG. 2, along with a cross-sectional view of a portion of the tool 500), the configuration of tool 100 is such that, after being fitted around tube 300, the tool 500 may be slid along tube 300 and inserted into connector 100. The walls of tool 500 force the outer ring 115 outwardly away from inner ring 105, such that the crown of teeth 116 are clear of lip 321 (e.g., the inner diameter 117 of outer ring 115 is expanded such that it is greater than a maximum diameter of the tube 300 where tube 300 interfaces with surface 121 of the connector 100 (i.e., at lip 321)). After such outward expansion, the tube 300 and the tool 500 may be removed from the connector 100 without damaging the tube 300.

It is to be noted that in some embodiments of the disassembly tool 500, the surface 520 of the tool 500 is such that it will not damage the tube 300/the lip 321.

Because the components are not damaged during disassembly, the pertinent re-usable components of the safety system 10 may be recycled for later use.

Given the disclosure of the present invention, one versed in the art would appreciate that there are other embodiments and modifications within the scope and spirit of the present invention. Accordingly, all modifications attainable by one versed in the art from the present disclosure within the scope and spirit of the present invention are to be included as further embodiments of the present invention.

What is claimed is:

1. A connector for connecting a male portion and a female tubular portion, wherein the male portion includes a first exterior projection that extends into the female portion having a second exterior projection, wherein the connector comprises:
    a first and second reaction surface,
    wherein the first reaction surface is positioned adjacent a surface of the first projection,
    wherein the second reaction surface is positioned adjacent a surface of the second exterior projection,
    wherein a portion of a cross-section of the connector taken in a plane lying on an axis formed by the longitudinal axis of the connector includes a contiguous element that substantially wraps around the second exterior projection,
    wherein the contiguous element lying on the plane forms a channel between which a wall of the female portion passes, a distance between two closest points on either side of the channel being smaller than a diameter of a portion of a cross-section of the second exterior projection, wherein the distance and the diameter are measured on the plane and are measured parallel to one another, and
    wherein an end of the inner collar is substantially parallel to and overlaps an end of the outer collar.

2. The connector of claim 1, wherein the channel is more narrow than the diameter of the portion of the cross-section of the second exterior projection measured on the plane and measured parallel to one another.

3. The connector of claim 1, wherein the connector is a unitary resilient structure that secures the male portion to the female portion without a threaded interface and without a crimped interface.

4. The connector of claim 1, wherein the connector includes an inner collar and an outer collar that together form an annular channel configured for the female portion to pass through the channel so that the second exterior projection is trapped inside the connector so as to robustly retain the female portion.

5. The connector of claim 1, wherein a cross-section of the connector taken in a plane lying on at least one of an axis formed by the longitudinal axis of the connector and an axis formed by the coaxial placement of the male portion inside the female portion includes a flattened portion that is in an approximate form of a flattened capital letter G of Arial font with a truncated top end or a flattened capital letter C of Arial font with two truncated ends.

6. The connector of claim 1, wherein a cross-section of the connector taken in a plane lying on an axis formed by at least one of the longitudinal axis of the connector and coaxial placement of the male portion inside the female portion includes the contiguous element that, with respect to the direction of the axis, extends away from the surface of the first exterior projection a first distance and then reverses direction to extend past the surface of the first exterior projection in the opposite direction and then reverses direction again to extend towards the surface of the first exterior projection.

7. The connector of claim 1, wherein the connector is configured to resist movement of at least one of the male portion and the female portion away from one another by applying a reaction force against the first exterior projection and applying a reaction force against the second exterior projection.

8. A connector for connecting a male portion and a female portion, comprising:
    an inner collar formed from a plurality of first teeth and an outer collar formed from a plurality of second teeth, an inner diameter as measured at the crown of the second teeth of the outer collar being greater than an outer diameter as measured at the crown of the first teeth of the inner collar, the inner collar and the outer collar being connected to one another, wherein the outer collar is coaxially positioned with respect to the inner collar so as to have a coaxial axis,
    wherein the connector is adapted so that the plurality of first teeth of the inner collar are elastically deformable at the same time away from the coaxial axis so as to increase a value of the outer diameter by at least twice a minimum wall thickness of the inner collar as measured proximate to the outer diameter,
    wherein the connector is adapted so that the plurality of second teeth of the outer collar are elastically deformable at the same time away from the coaxial axis so as to increase a value of the inner diameter by at least twice a minimum wall thickness of the outer collar as measured proximate to the inner diameter,
    wherein a portion of a cross-section of the connector taken in a plane lying on an axis formed by the longitudinal axis of the connector includes a contiguous element,
    wherein the contiguous element lying on the plane forms a channel between which a wall of the female portion passes, a distance between two closest points on either side of the channel being smaller than a diameter of a portion of a cross-section of an exterior projection of the female portion, wherein the distance and the diameter are measured on the plane and are measured parallel to one another, and
    wherein an end of the inner collar is substantially parallel to and overlaps an end of the outer collar.

9. The connector claim 8, wherein the connector is a unitary structure, and wherein at least one of the inner collar and the outer collar is biased so as to effectively resist movement away from the other of the outer collar and inner collar.

* * * * *